United States Patent [19]
Honda et al.

[11] Patent Number: 6,086,326
[45] Date of Patent: Jul. 11, 2000

[54] STATOR STRUCTURE FOR A TRACK OPENING OF A ROTARY MACHINE

[75] Inventors: Keith T. Honda, Ellington; Harvey I. Weiner, South Windsor, both of Conn.

[73] Assignee: United Technologies Corporation, Hartford, Conn.

[21] Appl. No.: 09/259,497

[22] Filed: Feb. 26, 1999

Related U.S. Application Data

[60] Provisional application No. 60/076,184, Feb. 27, 1998, provisional application No. 60/076,106, Feb. 27, 1998, and provisional application No. 60/076,107, Feb. 27, 1998.

[51] Int. Cl.[7] ............................................. F02K 3/04
[52] U.S. Cl. ......................... 415/145; 415/126; 415/144; 415/166; 60/39.07
[58] Field of Search .................................. 415/144, 145, 415/148, 150, 126, 166, 159; 60/39.07

[56] References Cited

U.S. PATENT DOCUMENTS

4,827,713  5/1989  Peterson et al. ........................ 415/150
5,380,151  1/1995  Kostka et al. ........................... 415/145

*Primary Examiner*—Edward K. Look
*Assistant Examiner*—Liam McDowell
*Attorney, Agent, or Firm*—Gene D Fleischhauer

[57] ABSTRACT

A stator assembly of an axial flow rotary machine has a compressor bleed system. The compressor bleed system includes an axially translating valve ring. The valve ring is movable between an open and closed position and includes guide roller and guide track having guide walls which urge the valve ring axially against resilient seal members. The track is contoured to provide a mechanical advantage when the valve ring is moved to the closed position. A liner is adapted to engage the stator assembly to form the track.

15 Claims, 8 Drawing Sheets

STATOR STRUCTURE FOR A TRACK OPENING OF A ROTARY MACHINE

This application claims benefit from U.S. Provisional Application Ser. No. 60/076,184 filed on Feb. 27, 1998, Ser. No. 60/076,106 filed on Feb. 27, 1998, and 60/076,107 filed on Feb. 27, 1998.

CROSS-REFERENCE TO RELATED APPLICATION

This application relates to copending U.S. Applications: No. (EH-10143PRO) entitled "Stator Assembly for a Track Opening of a Rotary Machine", by Keith T. Honda et al.; No. (EH-10291) entitled "Method of Forming a Track", by Keith T. Honda et al.; No. (EH-10154PRO) entitled "Stator Assembly for a Rotary Machine", by Keith T. Honda et al.; No. (EH-10145PRO) entitled "Roller Assembly for Guiding an Actuating Ring", by Keith T. Honda et al.; No. (EH-10145PPA) entitled "Roller Assembly", by Keith T. Honda et al.; No. (EH-10292) entitled "Method of Forming a Roller Assembly", by Keith T. Honda et al; and No. (EH-10154) entitled "Liner Housing", by Keith T. Honda et al.

TECHNICAL FIELD

This invention relates to a stator assembly for an axial flow rotary machine and more particularly to structure for actuating a device for selectively flowing air from a working medium flowpath of the machine. While the invention was conceived in the field of axial flow gas turbine engines for bleeding air at a point between two compressor rotor assemblies, it has application to other devices in such engines that employ an actuating ring.

BACKGROUND OF THE INVENTION

Axial flow gas turbine engines include a compression section, a combustion section and a turbine section. A flowpath for medium gases extends through these sections of the engine. During operation, the gases are pressurized in the compression section and fuel is added in the combustion section. The fuel is burned to add energy to the pressurized gases. The hot, pressurized gases are expanded through the turbine section to provide the work of compression and hot, high pressure gases for subsequent use.

U.S. Pat. No. 4,827,713 issued to Paterson et al entitled "Stator Valve Assembly for a Rotary Machine" is an example of such a gas turbine engine. In Paterson, the compression section of the engine is provided with two independent mechanical compressors. During transient operating conditions, one compressor can provide more flow than can be accommodated by the second compressor. Accordingly, the compression section is provided with a plurality of passages extending about the working medium flowpath to allow a portion of the air to escape from the compression section. In particular, the engine has a housing extending circumferentially about the axis of the engine. The housing has a plurality of openings. Each opening is covered or uncovered by an translating valve ring having circumferentially extending seal surfaces axially which move to engage resilient seal members. The valve ring is moved from an opened to a closed position by actuating means and includes guide roller assemblies in one ring and guide slots in the other ring.

The engine has resilient seal members which extend axially and circumferentially. In the closed position, the seal members extend between a valve ring and the seal surface. The valve ring is urged by simple actuating means from an open position to a closed position to axially compress the resilient seal members on either side of the openings to provide a gas tight seal.

The valve ring is movable between an opened and a closed position and being guided by a slot and guide pin combination for urging the valve ring axially against resilient sealing members, the slots being contoured to provide a mechanical advantage as the axial compressive force is applied to the resilient sealing members.

The valve ring is movable between an open position and a closed position. The ring is guided by a slot and pin (cam follower) configuration, the slot having a preselected contour as the ring compresses the resilient seal members such that an inclined plane effect is provided during compression. In one embodiment, a feature is a bushing which engages the cam follower and the adjacent stator structure as the valve ring is moved to the open position.

As will be realized, the loss of working medium gases through the openings under steady state conditions when the compressors are operating at their design point will cause a decrease in the efficiency of the engine. Accordingly, it is desirable to insure that flow does not occur through these openings under conditions which do not require the diversion of flow from the flowpath.

Figure 10:
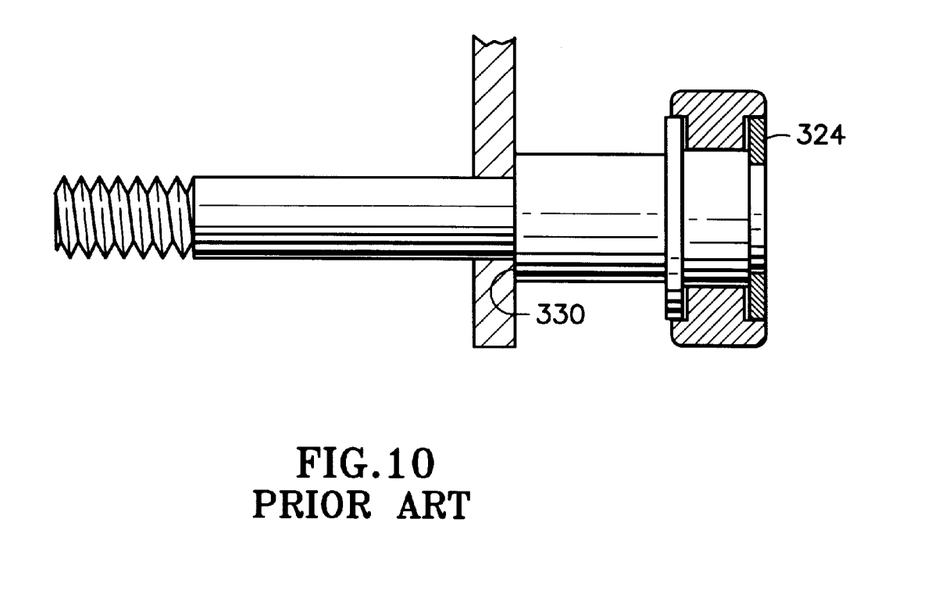
FIG. 10 is a view of a prior art roller assembly.

Another problem is wear on the surface of the track opening and fracture failures of the pin which holds the hardface roller assembly in engagement with the track opening. A particular concern of the prior art design shown in FIG. 10 is the potential failure of the roller assembly occasioned by the shank breaking or by the thrust element at the head of the pin coming free and allowing the rotatable element of the roller to fall into the engine and degrade the performance of the engine. For example, the roller assembly has a thrust element which is bonded or mechanically attached to the pin. Experience has shown that this thrust element has the capability to become separated from the pin.

The above art notwithstanding, scientists and engineers working under the direction of Applicant's assignee have sought to decrease leakage through such seals by improving the sealing effectiveness of the seals and decreasing the effect that distortion resulting from operative load has on seal components.

SUMMARY OF THE INVENTION

According to the present invention, a liner for the track opening of a guide assembly for a gas turbine engine has a pair of curved arc walls that are parallel and a reinforcing member extending between the walls to form a shaped track that positions the walls with respect to each other during manufacturing operations and under operative conditions.

In accordance with one detailed embodiment of the present invention, the track is generally U-shaped and the reinforcing member is a plate.

In accordance with one detailed embodiment, the plate has a pair of flanges extending from the walls that adapt the plate to engage the stator structure of the engine, the flanges having a first thickness in a direction substantially parallel to the walls and perpendicular to the flange and a base extending between the walls having a thickness which is less than the thickness of the first flange and the second flange.

In accordance with another detailed embodiment, the plate has at least one opening extending through the plate to decrease the continuity of the plate and the spring rate of the plate and to provide a means for draining fluid from the plate under operative conditions in the engine.

In accordance with one detailed embodiment, the interior of each wall has a coating to provide an anti-gallant to the walls, such as aluminum bronze, plasma spray coating or molydisulfide coating.

A primary feature of the present invention is a liner for positioning the actuating ring of a gas turbine engine. Another feature is the walls of the liner which follow a curved arc. In one detailed embodiment, the arc has a constant radius over a portion of the walls. In an assembled condition, the contour of the liner is adapted to match the contour of the roller assembly along a line of contact in the closed position. In one detailed embodiment in the assembled condition, elastomeric material is disposed between the liner and the housing to which the liner is attached.

A primary advantage is a track for a roller assembly which may be formed independently of the housing which supports the track. Another primary advantage of the present invention is durability of the liner and the ring assembly to which the liner is attached which results from using a harder material for the liner than for the track assembly. Another advantage is the reproducibility of the liner which results from positively supporting the walls with a base that forms a U-shaped structure during machining operations. Another advantage of the liner is the spring rate of the liner which results from the thickness of the liner between the walls as compared to attachment structure in its stalled condition. Another advantage is the durability of the liner that results from contouring the liner such that in the maximum load position of the liner is engaged along a line of contact which results from engagement between the roller assembly and the liner as the roller assembly moves from the open to the closed (maximum load) condition.

DESCRIPTION OF THE PREFERRED EMBODIMENT

Figure 1:
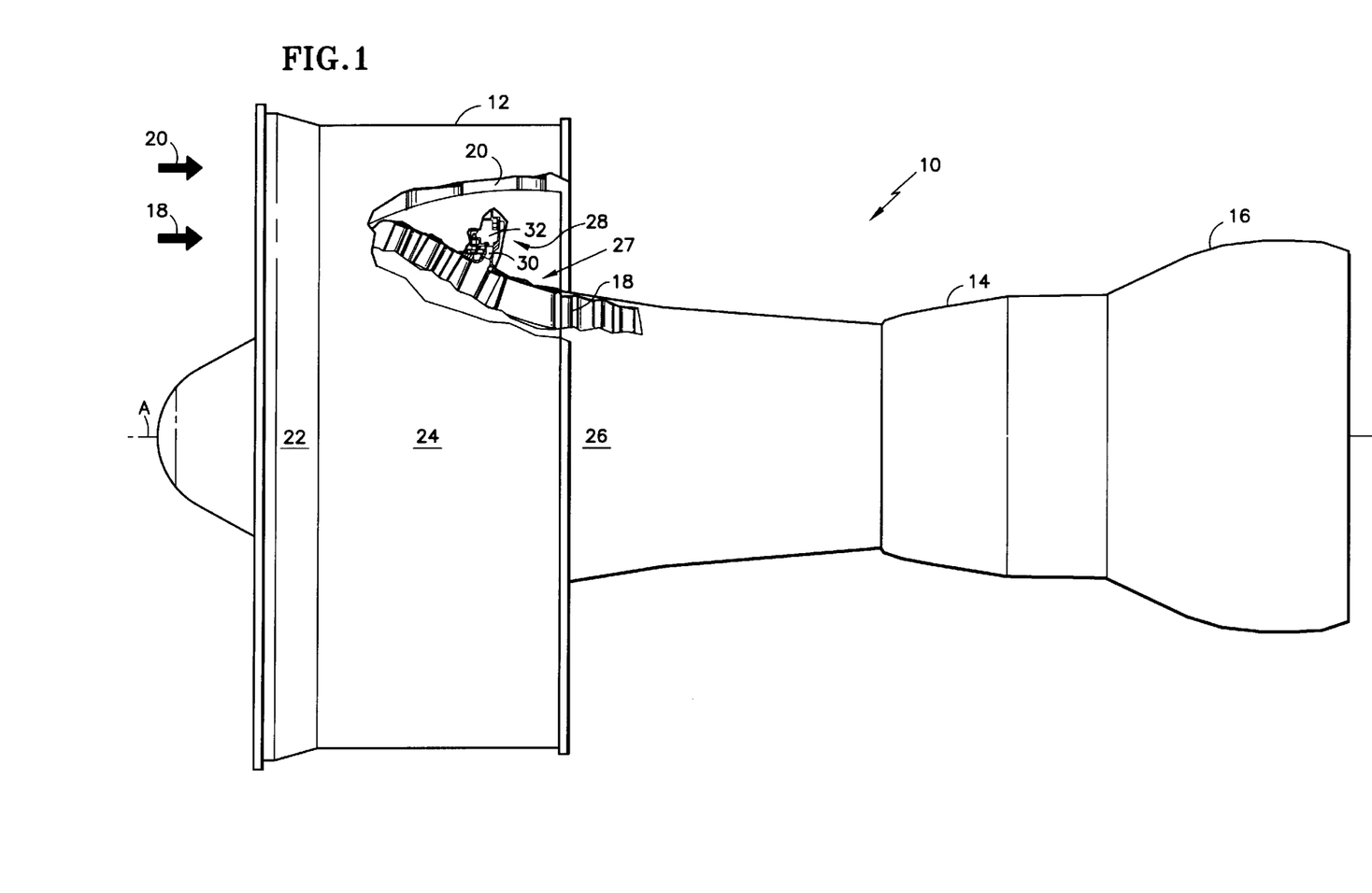
FIG. 1 is a side elevation view of a gas turbine engine with the exterior of the engine broken away to show a portion of the interior of the engine.

FIG. 1 is a side elevation view of an axial flow, gas turbine engine 10 of the turbofan type having an axis A. The exterior of the engine is broken away to show a portion of the interior of the engine.

The engine 10 has an annular compression section 12, a combustion section 14 and a turbine section 16, which are disposed about the axis A. A primary flowpath 18 for working medium gasses extends circumferentially about the axis of the engine and rearwardly through the sections of the engine. A secondary flowpath 20 for working medium gases, commonly called a bypass flowpath, is radially outwardly from the first flowpath and extends rearwardly through the outermost portion of the compression section of the engine.

The compressor section includes a fan 22, a first compressor section 24 and a second compressor 26 spaced rearwardly from the first compressor. The first compressor is commonly called the low pressure compressor and the second compressor is commonly called the high pressure compressor. These compressors are designed to operate at different speeds.

The engine has a stator assembly 27 having a compressor bleed system 28. The compressor bleed system includes a plurality of passages 30, an annular chamber 32 and a second plurality of passages (not shown) which place the primary flowpath 18 for working medium gases in flow communication with the secondary flowpath 20 through the chamber 32.

Figure 2:
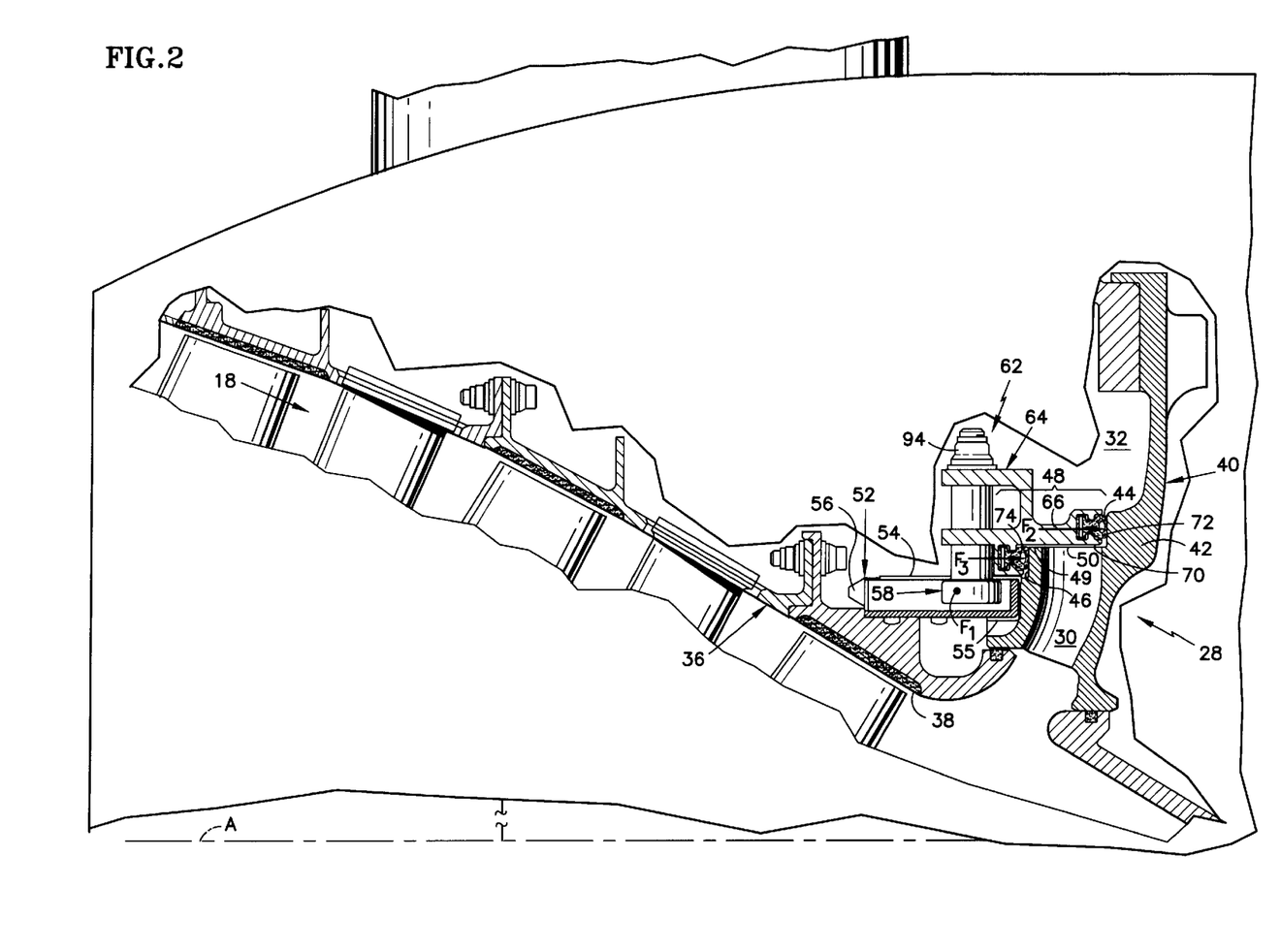
FIG. 2 is an enlarged cross-sectional view of a portion of the engine shown in FIG. 1.

FIG. 2 is an enlarged view of a portion of the engine shown in FIG. 1 showing in further detail the compressor bleed system 28. An inner case 36 has a flowpath wall 38 which outwardly bounds the primary flowpath 18. A housing assembly 40 has a housing 42. The housing extends circumferentially to bound a portion of the annular chamber 32. Each passage 30 extends from the primary flowpath 18 to the chamber 32 through the inner flowpath wall and through the housing.

The housing 42 is of a one-piece construction. The housing has a pair of seal surfaces 44,46 extending circumferentially about the housing. The seal surfaces are oriented in the axial direction and face upstream. The seal surfaces are spaced axially defining a seal region 48 therebetween. An outwardly facing, cylindrical surface 49 extends axially between the seal surfaces. The seal surfaces are located such that each passage through the one-piece ring has an opening 50 in flow communication with the seal region.

Figures 4A, 4B:
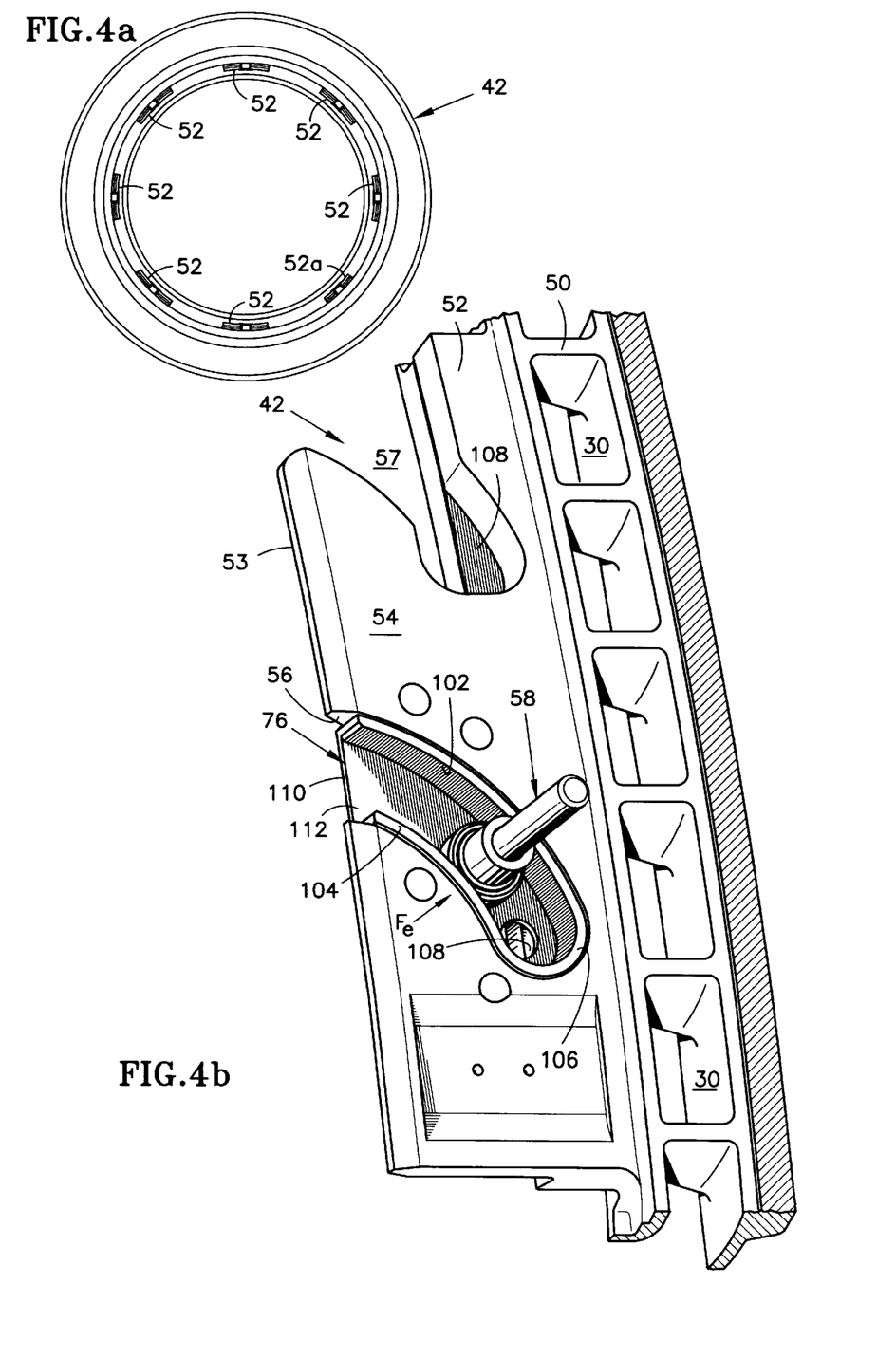
FIG. 4a is a front view of a portion of the stator assembly shown in FIG. 2 and FIG. 3.
FIG. 4b is a partial perspective view of the housing shown in FIG. 3 showing the liner, the roller assembly and two adjacent slots formed in the housing.

The housing has a plurality of axially extending flanges 52 as shown in FIG. 4a. Each local flange has an edge 53, outwardly facing surface 54, an inwardly facing surface 55 and a plurality of track openings, as represented by the track opening 56, which adapts the housing to receive a plurality of roller assemblies 58.

The compressor bleed system includes a valve 62 having a valve ring 64. The valve ring has a sleeve 66 outwardly of the passageways 30 in the housing. The sleeve is concentrically disposed with respect to the cylindrical surface 49 of the housing. The valve is movable to a first, open position (shown in FIG. 3) and to a second, closed position as shown in FIG. 2. The valve ring has an inwardly facing surface 70 which is adapted, if required under operative conditions, to slidably engage the corresponding outwardly facing cylindrical surface 49 on the housing. The valve ring has two axially facing seal members 72,74 which are oriented in the downstream direction and which are spaced axially by a distance which permits each to engage an associated seal surface 44,46 on the housing. The compressible seal members may be made of any material that is compatible with the environment and which resiliently deforms upon the application of pressure. One particular compressible seal member is disclosed in U.S. patent application entitled "Valve Seal Assembly", (EH-10146), assigned to the assignee of the present invention, the subject matter of which is incorporated herein by reference.

Figure 3:
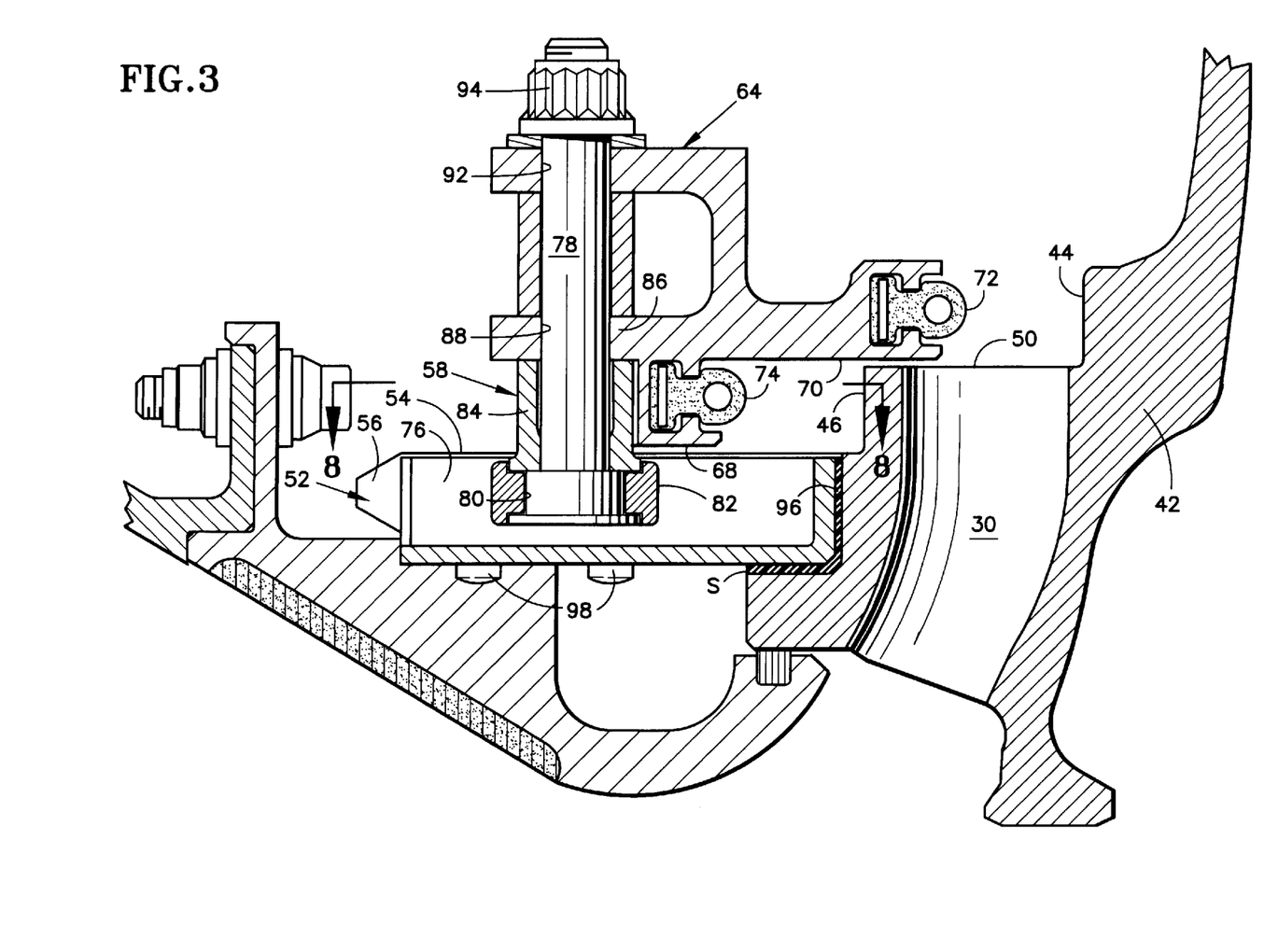
FIG. 3 is an enlarged cross-sectional view of a portion of the engine shown in FIG. 2 with portions of the engine broken away for clarity.

FIG. 3 is an enlarged cross-sectional view of a portion of the engine shown in FIG. 2 with portions of the engine broken away for clarity. FIG. 3 shows in detail the roller assembly 58 and a liner 76 for the track opening 56 in the flange. The roller assembly 58 includes a pin 78, a bearing surface 80 on a rotatable element or roller 82 which engages the pin and a collar 84 disposed between the pin and one of the supports 86 of the valve ring 64. The pin extends through holes 88,92 in the valve ring which are slightly (thousandths of an inch) larger than the pin. A fastener, such as nut 94, engages the pin to exert a force on the pin causing the pin to clamp the collar against the support.

FIG. 3 also shows the liner 76 for the roller assembly 58. The liner is disposed in the local flange 52 of the housing in the first track opening 56. Elastomeric material 96 is disposed between the walls of the liner assembly and in some applications may extend between the bottom of the liner and the housing. Fasteners, as represented by the rivets 98, extend between the liner and the flange of the housing to attach the liner to the housing.

FIG. 4a shows a front view of a housing 42 having the passages 30 (not shown) for bleed air from the flowpath 18 of the engine. As shown in FIG. 4a, the housing has seven local flanges 52, each having one of the first plurality of openings for the liner. In addition, the housing has a flange 52a which adapts the housing to engage a bellcrank assembly for driving the valve ring between the first and second positions. The bellcrank assembly may be of the type shown in U.S. Pat. No. 4,827,713, issued to Patterson, or might be of the type shown in U.S. patent application entitled "Bell Crank Mechanism", (EH-10147), filed on the same date herewith and assigned to the assignee of the present invention, the disclosure of which is incorporated herein by reference.

FIG. 4b is a partial perspective view of the housing 42 shown in FIG. 3 and FIG. 4a showing the liner 76 and the roller assembly 58. Two adjacent track openings are formed in one of the local flanges of the housing. There are two types of track openings 56,57. Each of the first plurality of track openings 56 receives the liner. The liner has a first rail wall 102, a second rail wall 104 and an end wall 106 extending circumferentially and axially between the walls 102,104. As can be seen, the track opening extends over a portion of the housing having a shelf 108. A space S between the shelf and the liner receives the elastomeric material shown in FIG. 3. The liner has a base 112 having a hole extending radially therethrough as represented by the hole 174 shown in FIG. 7. The second type of track opening 57 is designed to receive a damping roller assembly of the type shown in FIG. 6. The second track opening does not have a liner.

Figure 5:
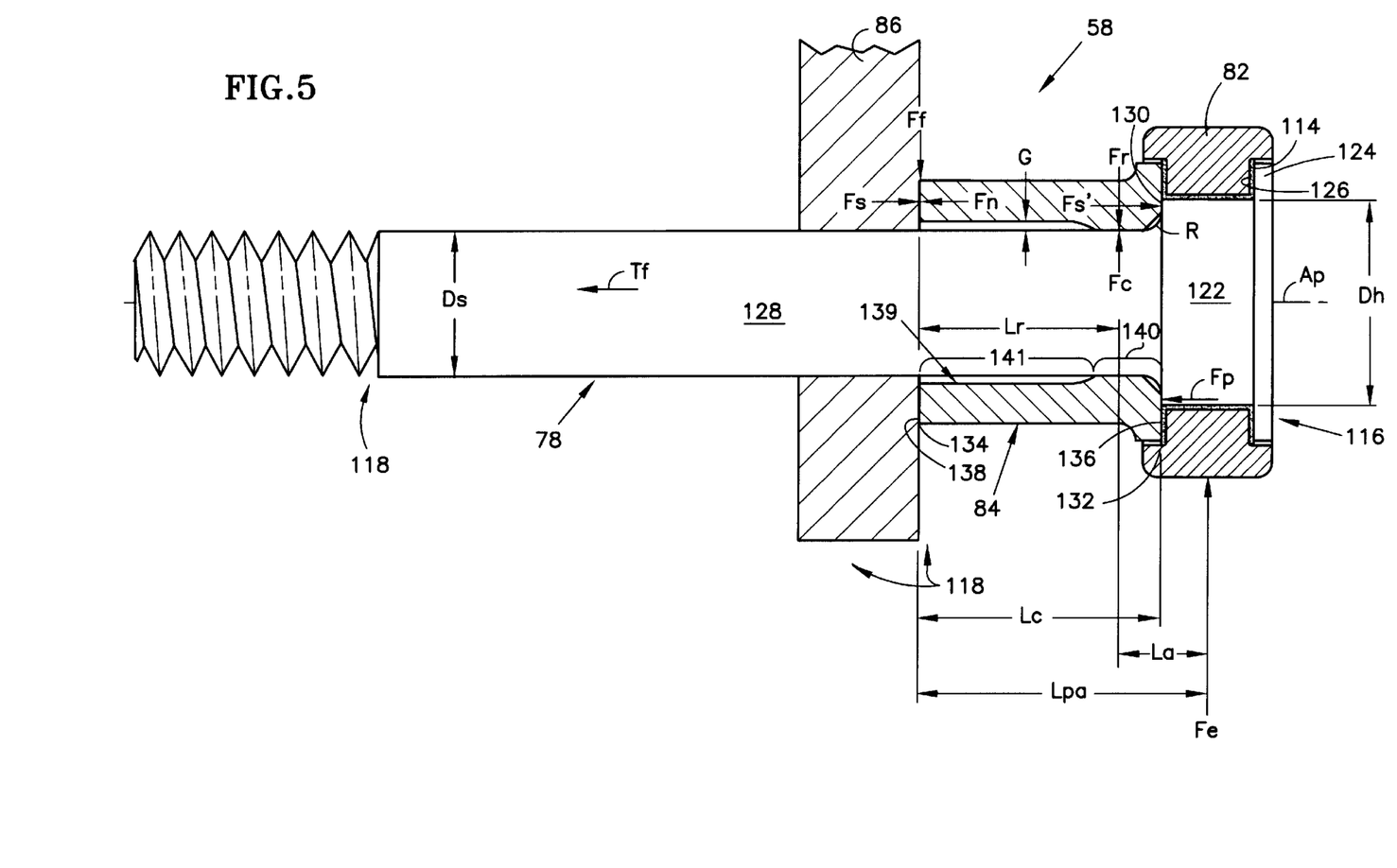
FIG. 5 is an enlarged side elevation view of a portion of the engine shown in FIG. 3 showing in detail the relationship of the elements of the roller assembly.

FIG. 5 is an enlarged side elevation view of a portion of the engine shown in FIG. 3 showing in detail the relationship of the elements of the roller assembly 58. The roller assembly 58 is disposed about an axis Ap and has a raceway, commonly referred to as a race, which receives the rotatable element, roller 82. The race might simply be the adjacent elements having surfaces which bound the opening that receives the rotatable element, and may include a thin layer of material on the surfaces or a thin layer of material in faying contact with the adjacent elements, which are represented by the race 114. The material may be disposed in the assembly as a unit or sprayed on the adjacent surfaces. Alternatively, the thin layer of material might be directly applied to the rotatable element. The material used with the race may be formed of, for example, a proprietary Teflon fiberglass material disposed in a polyamide resin such as a self lubricating proprietary composition available from the Kamatics Corporation as K-Therm. T-87 Material. The Kamatics Corporation is a Kaman Company, P. O. Box 3, Bloomfield, Conn. 06002.

The pin 78 of the roller assembly 58 forms or bounds a portion of the race 114 which receives the rotatable element 82. The pin has a first end 116 and a second end 118. The pin has a head 122 at the first end which extends circumferentially about the axis Ap to define the innermost portion of the race for the rotatable element. A thrust member 124 extends radially outward from the head. The thrust member is formed as one piece with the head. The thrust member has an axial facing surface 126 which forms or bounds one side of the race. A cylindrical shank 128 extends axially from the head and is disposed about the axis Ap. The shank has a diameter Ds which is smaller than the diameter of the head Dh. A fillet radius R extends between the head and the shank. The pin includes a clamping surface 130 which extends radially between the shank and the bottom of the race. The clamping surface faces in an axial direction toward the second end 118 of the pin for exerting a clamping force on the collar 84.

The collar 84 has a first end 132 disposed adjacent the head 122 of the pin 78. A second end 134 adapts the collar to engage the support 86. A first radial surface 136 at the first end extends radially outwardly and engages the clamping surface 130 of the head 122 of the pin. The first radial surface extends beyond the clamping surface to form or bound the second side of the race.

A second radial surface 138 of the collar 84 is spaced axially from the first radial surface by a distance Lc. The second radial surface extends circumferentially about the collar to form a clamping surface for the collar. The clamping surface adapts the collar to engage the support 86 of the ring.

The collar 84 has an internal axial surface 139 which extends from the first radial surface 136 to the second radial surface 138. The internal axial surface further has a first region 140 adjacent the head which engages the shank 128 with a compressive force. The collar has a second region 141 spaced radially outwardly from the shank 128 to leave a gap G between the collar and the shank which extends to the support 86. The second region is spaced radially outwardly of the first region which extends from the second region to the clamping surface 130.

Figure 6:
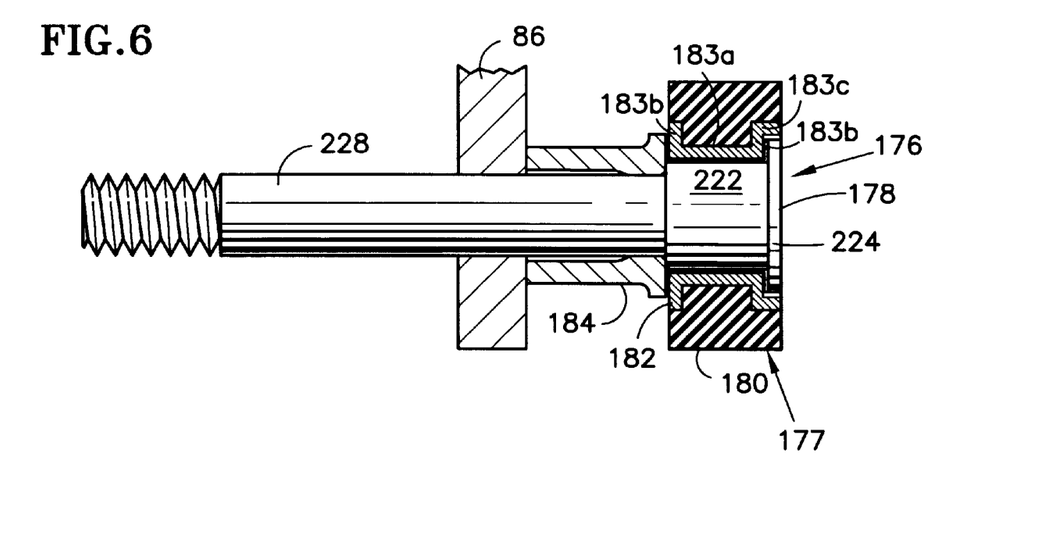
FIG. 6 is an alternate embodiment of the roller assembly shown in FIG. 5.

FIG. 6 is an alternate embodiment 176 of the roller assembly 58 shown in FIG. 5. This embodiment is used as a damper roller assembly. Each of these damper roller assemblies is disposed in one of the plurality of second track openings 57 to provide damping as the ring moves from the open to the closed position. In this embodiment, the damper roller assembly has a roller 177 using rubber material 180 molded into a circumferentially extending steel member 182. One embodiment of the member is a steel rim having a circumferentially extending bottom 183a, a pair of radially extending sides 183b, and an axially extending lip 183c. The rubber is a Viton Rubber material impregnated with Kevlar fibers and is available from Jonal Laboratories Inc., Meriden, Conn. The rubber material is molded onto the steel rim (AMS 5630) which allows greater rim engagement and bond strength.

The race is formed as is the race shown in the embodiment of FIG. 5 with K-Therm T-87 Material from the Kamatics Corporation. The remainder of the assembly 176 is very similar to the hard roller assembly shown in FIG. 5 utilizing a pin 178, a collar 184 and a head 222. It is a one piece construction with a thrust member 224 extending radially outwardly from the pin. As used with respect to the roller assemblies in FIG. 5 and FIG. 6, the term "one piece" means that the thrust element is formed as a unitary structure with the pin and is not joined, mechanically attached or bonded to the pin. In addition, the damper roller assembly has a shank 228 on the pin which extends through the support of the ring which is spaced radially slightly from the support to provide a gap between the support and the shank.

Figures 7, 7A:
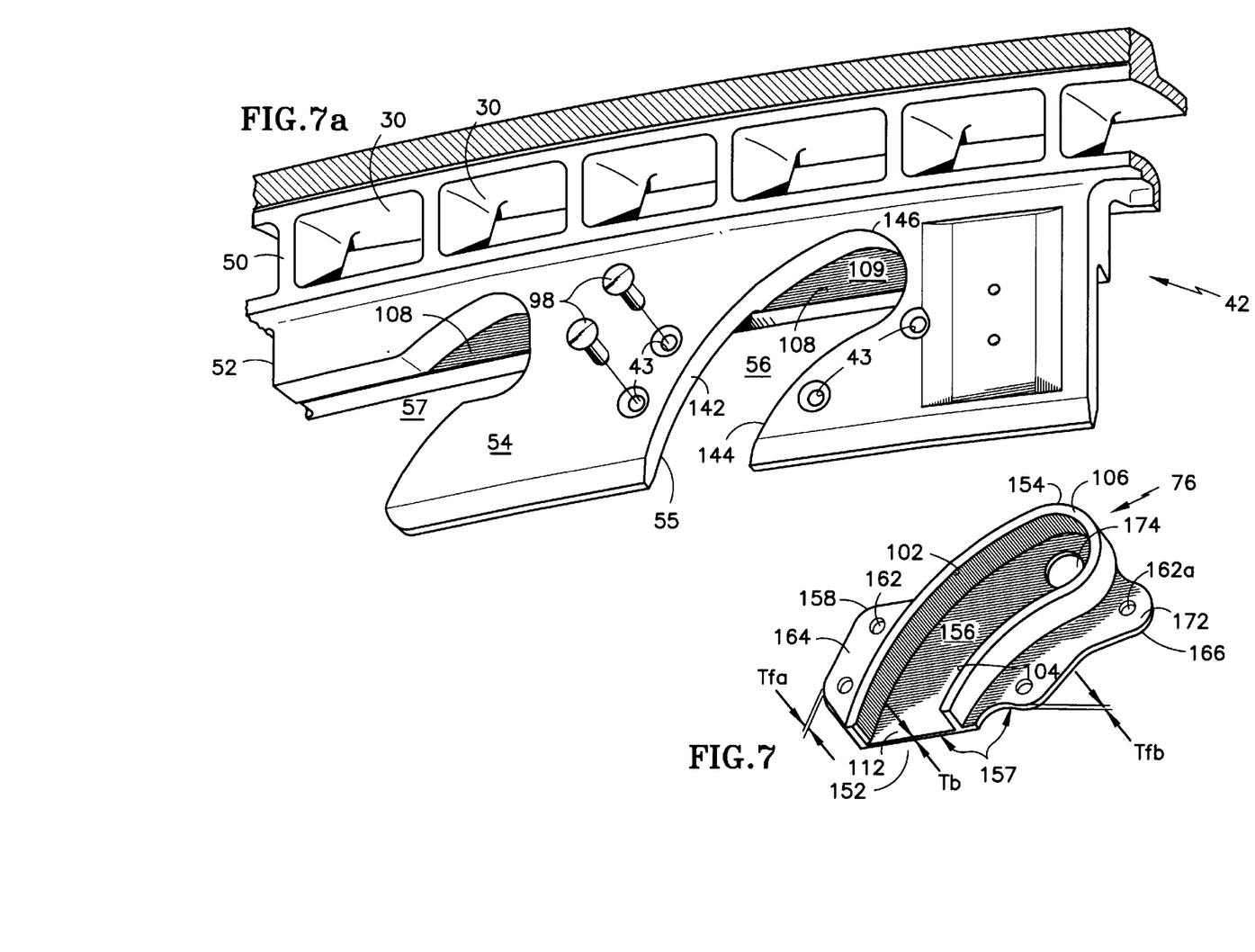
FIGS. 7 and 7a are a partial perspective view of the structure shown in FIG. 4b in exploded fashion showing the relationship of the liner and rivets to the housing.

FIGS. 7 and 7a are a partial perspective view of the structure shown in FIG. 4b in exploded fashion showing the relationship of the liner 76 and rivets 98 to the local flange 52 of the housing 42. The housing has pairs of holes 43 for receiving the rivets. The rivets have a spring constant in the installed condition which is less than the spring constant of the housing and are able to flex in the installed condition should there be differential thermal growth between the housing and the liner.

The track openings 56,57 extend axially and circumferentially in the flange 52 and adapt the flange to receive the roller assemblies 58,176. The first openings 56 extend through the flange from the outer surface 54 to the inner surface 55 of the flange at least over a portion of the track opening. The opening extends axially and circumferentially over a portion of the remainder of the housing to form the shelf 108 shown in FIG. 4b. The shelf has an outer surface 109 which faces in the radially outward direction and which adapts the housing to receive the elastomeric material 96 or may be simply spaced slightly from the liner 76 in the installed condition.

Each of the first openings 56 is bounded by a first side 142, a second side 144 spaced circumferentially from the first side and a third side 146 which extends circumferentially between the first side and the second side. In the embodiment shown, the first and second sides may be formed such that they are relatively parallel, such as by being formed by radiuses having a common center. However, these sides are not necessarily made so precisely. This permits for easy machining in the repair or modification of a structure having worn surfaces in the first track openings. A method of modifying the slot is to remove worn material from both surfaces until the opening is large enough to accommodate a liner 76. Thus, the method of modification has the advantage of not requiring precise machining of the first track openings once the holes 43 for the fasteners are precisely located.

The liner 76 has a first end 152, a second end 154 and an opening or track 56 extending from the first end to the second end. The liner includes the first rail wall 102 extending from the first end between the first end and the second end. The first rail wall does not necessarily extend to the second end but may terminate at that location in embodiments which do not have an end wall. The first rail wall 102 has a constant radius for a region which extends over one half the distance between the first end and the second end. The second rail wall 104 is spaced laterally from the first rail wall in the generally circumferential direction. The second rail wall extends parallel to the first rail wall from the first end between the first end and the second end. The second rail wall has a constant radius for a region which is parallel to the first rail wall.

The second rail wall may terminate at the second end as may the first rail wall. Alternatively, and as shown, an end wall 106 extends laterally from the first rail wall to the second rail wall.

A plate 157 extends laterally with respect to the rail walls. The plate includes the base 112 having a thickness Tb. The plate extends to the first rail wall 102 and the second rail wall 104. The plate might be continuous for the region between these two walls or may be formed of a series of local reinforcing braces which extend between the walls with one or more holes or openings between the braces as represented by the opening 174. The plate also engages the end wall. The combination of the plate, and the end wall 106 supporting the first rail wall and the second rail wall enables machining of the liner out of a hard material such as steel while maintaining reproducibility between liners. Reproducibility avoids difficulties associated with installing the liner and insuring the new rail walls follow the track of the roller assembly where the liner is used to modify an existing housing formed of relatively soft material, such as aluminum alloy, which has a worn track opening.

A first flange 158 extends laterally from the base 110 adjacent at least one of the walls, such as rail wall 102. The first flange has a radial thickness Tfa and at least one hole 162 which adapts the base 110 to receive a fastener. In the embodiment shown, the flange has two holes to receive rivets. The first flange adapts the liner to engage the circumferentially extending stator structure in the engine such as the housing 42. The flange has an outer surface 164 which engages in the inner surface 55 of the housing in a faying relationship, as shown with reference to FIG. 7 and FIG. 8. The second flange 166 extends laterally from the base adjacent one of said walls having a cylindrical portion. The second flange has a thickness Tfb. The thickness Tfa and Tfb are larger than the thickness Tb to provide a larger bearing area to the rivets and to reduce the stiffness of the liner under operative conditions by reason of the decreased thickness Tb of the base in comparison of the thickness Tfa and Tfb. The second flange adapts the liner to engage the housing, has holes 162a, and has an outer surface 172 which is in faying relationship in the installed condition with the inner surface of the local flange. In addition, the end of the liner has an opening, such as the opening 174, extending through the base which interrupts the continuity of the base, decreases its spring rate and provides for the drainage of liquid should the liner accumulate such liquid by reason of its location at the top of the engine.

Figure 8:
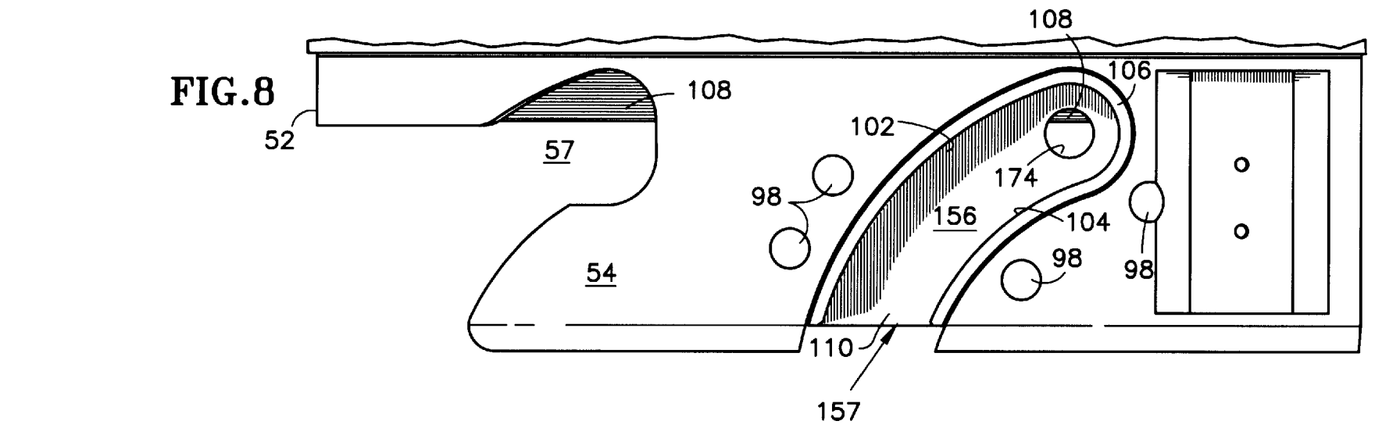
FIG. 8 is a plan view taken along the lines 8—8 of FIG. 3.

The rail wall which the roller assembly engages has a contour which is adapted to conform closely to the contour of the roller assembly in the installed condition at the second, closed position as shown in FIG. 2. For example, the inner wall 104 at the closed position extends substantially parallel to the outer wall or surface of the rotatable element such that there is line contact between the cylindrical wall and the rotatable element. The location of the closed position is normally within the width of the track as measured between the walls and the location at which the walls are parallel as shown in FIG. 8.

Figure 9:
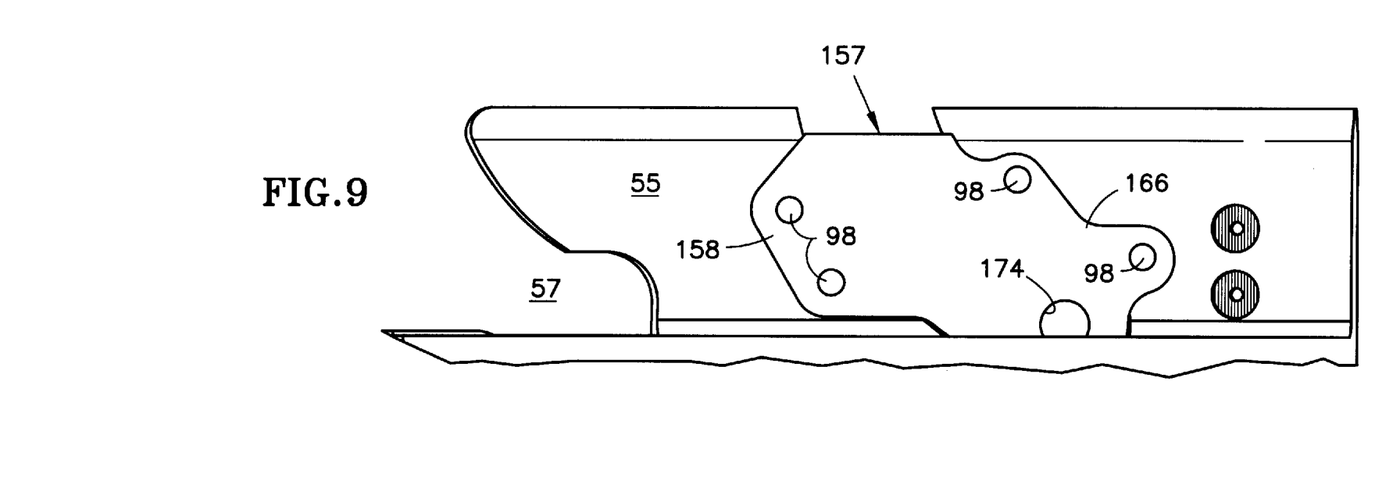
FIG. 9 is a bottom view of the structure shown in FIG. 8.

As shown in FIG. 9, a portion of the plate 157 of the liner 76 extends over the outer surface of the shelf 108 and the liner flanges 158,166 engage the inner surface 55 of the local flange. As a result, the construction could experience the loss of three rivets 98; and as long as one rivet retains the liner in place, the liner would not fall free from the housing by reason of the flanges and the base being trapped in opposite radial directions by the shelf 108 and the inner surface 55 of the housing. In such a case, the single rivet prevents the liner from backing out of its trapped engagement between the outer surface of the shelf and the inner surface of the flange.

During operation of the gas turbine engine shown in FIG. 1, working medium gases are flowed along the primary and secondary flowpaths 18,20. As the gases pass through the first and second compressor 24,26, and as the operating speeds of the individual compressors are adjusted during transient conditions, it may be desirable to divert some of the flow from the primary flowpath 18 to the secondary flowpath 20. The valve ring 64 is moved from the closed position shown in FIG. 2 to the open position shown in FIG. 3. The valve ring is guided positively in a spiral motion by the roller assemblies 58. Each roller assembly moves in an associated track opening 56 in the housing 42. The liner of the opening is formed of a harder material (steel) than the adjacent housing (aluminum alloy AMS 4218 or AMS 4235 material depending on temperature). The liner provides a more durable structure as the hard, inelastic roller of the roller assembly (steel) moves along the line of spiral motion in the slot. The liner might be provided with a wear-resistant coating, such as an aluminum bronze plasma spray coating or a molydisulfide coating, to provide anti-gallant properties to the liner.

At least a portion of the rail walls 102,104 of the liner is cylindrical. The cylindrical shape approximates the ideal spiral or helical surfaces followed by the roller 82, as it moves from each contact point to the next. This simplifies manufacture of the liner, by permitting use of a two axis cutting machine to form the rail walls. A more complex four or five axis cutting machine could form rail walls having the ideal shape. However, cylindrical walls facilitate consistently reproducing the contour of the tracks and correctly inspecting the finished product.

As the roller follows the cylindrical track, the roller has point contact at each location that it presses against the wall. As a result, the roller 82 follows a line of contact until the roller reaches the closed position of the housing 42 at which location the cylindrical surface of the roller conforms closely to the cylindrical surface of the liner. This insures in the highly loaded closed position that the roller assembly engages the cylindrical surface of the second rail wall 104 of the liner with a line of vertical contact with less pressure than were it to engage the wall with point contact as it does in the lightly loaded condition as it moves between the open and closed positions. In other embodiments, the roller might have a crown which reduces the line of contact in the closed position. This has the advantage of more precisely locating where the external force Fe acts on the roller and on the track wall.

Differences in the thermal expansion occur between the liner and the housing. The liner 76 is configured to have a spring rate in tension which is sufficiently low in series combination with the spring rate of the fasteners such that it is less than the spring rate of the remaining portion of the valve ring. In this embodiment, the spring rate is significantly less. In addition, the housing 42 has the local flanges 52 having a relatively low spring rate compared to the rest of the housing 42. Each local flange supports a liner from the housing like fingers extending from a palm. This provides the advantage of allowing the housing 42 to accommodate changes in temperature by growing significantly more in the radial direction than does the liner. A significant advantage is that it permits use of less dense but higher thermal expansion material, such as the aluminum alloy mentioned earlier, for the relatively massive housing.

The lower spring rate in the liner 76 results in part from reducing the thickness of the plate 157 which extends between the walls 102, 104, 106, removing material from the plate, such as through the drain hole 174 or additional holes or cut outs between the track wall, and providing local flanges 158,166 to the plate to attach the plate to the housing 42. Thus, even though the coefficient of thermal expansion of the housing is approximately twice the coefficient of thermal expansion of the liner and even though the hard material of the liner has a higher modulus of elasticity E, the liner 76 for the track grows and contracts with the housing, accommodating changes in diameter of the housing as the housing experiences different temperatures under engine operative conditions. This avoids over-stressing the housing, the liner and the fasteners for the liner.

Vibrations in the ring 64, vibrations in the liner 76 and vibrations in the roller assembly 58 all provide the potential for increased wear of, and stresses in, the roller assembly and the liner. The vibrations also produce stresses in these components. Anti-gallant material on the interior of the liner and damping media for vibrations act to reduce these stresses and the wear that results from the vibrations. One satisfactory elastomeric material is silicone rubber and is available from the General Electric Company, Waterford, N.Y. 12188, as RTV 159 Silicone Rubber. Any rubber sealant or elastomeric potting material would provide damping. The elastomeric material damps vibrations which are transmitted from the ring to the liner and damps vibrations in the liner which result from engine operation and from the roller assembly vibrating as the roller assembly follows the track. These result from the roller assembly moving radially in and out or in any direction, although the elastomeric material in this embodiment is more effective for damping vibrations in the circumferential and axial directions. In addition, the elastomeric material damps vibrations that occur as the roller assembly tracks the liner with impact loads as the vibrating roller assembly moves from the open to the closed position.

Damper roller assemblies 176 are also provided at each local flange as in the earlier embodiment. The newly designed damper assemblies, similar to the cam follower roller assemblies, have an elastomeric roller. The damper roller assemblies are disposed about the circumference of the housing adjacent between the hard roller assemblies at each local flange. These roller assemblies dampen vibrations in the valve ring that are transmitted to the roller assembly and vibrations in the housing that are transmitted to the liner assembly even though the elastomeric material disposed between the liner and the housing acts to dampen those vibrations. Thus as the roller assembly move to the open position, the resilient damping roller assemblies 176 are compressed providing a means to damp vibrations and block the roller assembly from wearing the liner.

As the valve ring moves between the open and closed positions, the radially facing surfaces 68,70 on the valve ring and on the housing 50,54 act to center the valve ring about the housing. Further centering is provided by the roller assembly which provides a spline type connection, as where a plurality of roller assemblies are spaced around the circumference of the valve ring and the housing, and, the roller assembly is attached to one ring and engages the other housing.

As shown in FIG. 2 by the reaction forces F1, F2 and F3, the seal compression loads in the closed position are all reacted in the housing area of the static structure. This includes F1 which is the roller assembly load on the support structure (and Fe, which is the reactant load on the roller assembly and is shown in FIG. 5) in reaction to the seal loads, and F2 and F3 which are seal loads on the support structure. This has the advantage of reducing any turning moments which result from the coupling of the forces and reduces relaxation of the seal compression during operative conditions as compared to structures in which such loads are more widely separated through use of a several piece construction for reacting the loads.

The following discussion of the reaction of the roller assembly to the external force Fe assumes statically determinate structures and rigid members to illustrate the conceptual operation of the design and the advantages of the design. Under some operating conditions, the structure may become indeterminate and flex but the advantages will remain and are based on the following understanding of its operation.

Torquing the nut which engages the pin of the roller assembly causes a tensile force Tf in the pin. The pin exerts a clamping force on the collar through the clamping face or surface 130 of the pin 78. The clamping force provides a preload and places the collar 84 in compression. The clamping force presses the clamping surface 138 of the collar against the support 86 around the entire circumference of the collar with a predetermined force Fn. The present construction has advantages whether the predetermined force is at the correct level or at less than the correct level which may change the interaction between the collar and the support.

The roller transmits the external reaction force Fe to the head of the pin. The collar resists the external force Fe on the pin with the frictional force Ff developed between the clamping surface of the collar and the support. This frictional force Ff results from the coefficient of friction at the clamping surface multiplied by the normal force Fn at the clamping surface on the collar against the support. The resisting force is represented by the resultant force Fr (opposing the external force Fe) and acts at the first region 140 of the internal axial surface of the collar which is pressed on the shank of the pin. The fit is 0.0002–0.0012 inches tight on a diameter, but is not important to achieve the primary advantages of the invention. The fit could be loose if adequate preload/clamping could be maintained to provide a friction force between the collar and pin that is larger than the force Fe. For example, the collar might be loose having a conical interface with the pin to resist the force without friction. This would result in the same bending stresses in the pin. In other alternate constructions, the first region of the internal surface might be spaced slightly from the shank of the pin but inwardly of the second region. In such a construction, the benefit of the present invention is realized as the pin deflects slightly to engage the internal surface at the first region such as might occur where the clamping force is lost or was never applied because of insufficient tightening of the nut.

The force Fr acts in close proximity to the force Fe by engaging the pin at the first region. This is significant because the resisting force Fr balances the external force Fe but creates a force couple Fe-Fr. The force couple Fe-Fr has a moment arm La and exerts a bending moment on the pin and bending stresses in the pin. The moment Fe-Fr and the stresses are proportional to the length of the moment arm La, which is shortened by having Fr act in close proximity to Fe. The frictional force Ff with the force in the pin Fc creates a moment acting on the collar equal to the moment of the external force couple Fe-Fr. The moment of Ff-Fc is resisted by the force couple Fs-Fp acting on the collar from the support and the pin. Thus, the moment of Fs-Fp equals the moment of Fe-Fr and the couple Fs-Fp causes internal bending stresses in the pin that are proportional to the couple Fe-Fr.

A particular advantage of the present invention is the magnitude of the moment Fe-Fr and the resulting bending stresses in the pin. The moment of Fe-Fr is smaller than prior art constructions because the moment arm La is smaller than those constructions in which the collar has a press fit along the entire length of the shank (which moves the resultant force Fr away from the head of the pin and increases the moment) or prior art constructions having a shoulder on the pin which exerts a clamping force directly on the support, such as is shown in FIG. 10. In this last example, the moment arm Lpa for the force Fr has a length which is much greater than La and greatly increases the moment of couple Fe-Fr which ultimately acts at the surface of the support and causes bending stresses in the pin.

The couple Fe-Fr is maintained by maintaining the gap G at a value that prevents contact between the collar and the shank with bending deflections. The load path changes if contact occurs. Making the gap G larger than the minimum necessary to prevent contact at the second region decreases clamping area at the support for the same outside diameter of the collar at the support. The frictional force required to keep the assembly from sliding is at least equal and opposite to the force Fe. It is a function of clamping force (preload) and is independent of area. However, maintaining clamping area at the support results in less wear for supports formed of softer than steel, but lighter weight aluminum structures.

The roller assembly of the present invention also has advantages in constructions where the external force Fe exceeds the frictional force Ff. This may occur because of an anomaly in operating conditions or because the preload Fn is too small because of undertorquing.

In such cases, the external force Fe will cause bending of the shank and the collar may slide or tilt slightly. Again, the moment arm Lr is increased by spacing the collar away from the shank which decreases the amount of normal force Fs of the couple Fs-Fp and the frictional force required to balance the moment required to resist the moment caused by the external force. Several advantages result from this construction. Reducing Fs reduces the pressure on the surface and reduces galling at the surface of the support which results from micro adjustments of the collar in response to the external bending moment.

A significant advantage for durability of the pin is the absence of a stress riser (change in diameter of the pin) at the location of the maximum bending moment in the shank. The maximum bending moment in the shank takes place where the internal bending moment in the shank combined with Ff-Fc resists the external bending moment. This takes place at the location of the support, spaced by the distance Lc from the clamping face of the pin. This avoids having the clamping face of the pin at the support and its associated stress riser connected with the increase in diameter to form the clamping face.

Two other advantages result from spacing the clamping surface of the pin from the support with the collar: the first is removing the decreased surface area at the clamping face of the pin from bearing on the soft surface of the support, which results from the fillet radius R introduced between the shank and the damping face on the pin to decrease the stress concentration by avoiding a sharp change in cross section of the pin. The reduced surface area increases the potential for yielding or wearing of the support, which could cause a loss of clamping. In the present construction, the clamping face of the pin with the fillet radius engages the collar. Although the pin has reduced area which increases the pressure exerted by the normal force (which galls or yields the soft surface of the aluminum alloy support in the prior art) it does not have that effect on the hard surface of the steel collar. In addition, this reduced area is not reduced significantly, because the fillet radius can be small due to a higher stress concentration allowed by the reduced bending moment at this location). The area is not important for galling on the collar and the collar is still capable of maintaining the clamping requirement.

As will be realized, the roller assembly might be rigidly mounted to the housing and the liner mounted on the valve ring. These are equivalent structures to the structures disclosed and claimed herein. Finally, one or both of the compressible seal members might be mounted on the housing rather than being retained by the valve ring as shown in FIG. 2.

Although this invention has been shown and described with respect to the detailed embodiments thereof, it will be understood by those skilled in the art that various changes in the form and detail thereof may be made without departing from the spirit and scope of the claimed invention.

We claim:

1. A stator structure 42 for a rotary machine having track openings 56 for receiving a roller assembly 58 having a rotatable element 82 which moves between two positions under operative conditions, which comprises:
    a liner 76 which is adapted to be disposed circumferentially about the axis of the machine in a track opening 56 which has
        a first end 152,
        a second end 154,
        an opening 156 extending from the first end to the second end which is adapted to receive the rotatable element,
        a first rail wall 102 extending from the first end between the first end and the second end;
        a second rail wall 104 spaced laterally from the first rail wall; and,
        a support member 106, 112 extending laterally with respect to the rail walls;
    wherein the pair of rail walls bounds the opening 156 for guiding the rotatable element of the roller assembly as the rotatable element moves from the first position to the second position and wherein the liner includes locating surfaces for locating the liner with respect to the stator structure 42.

2. The stator structure 42 for a rotary machine having track openings 56 for receiving a roller assembly 58 of claim 1 wherein the locating surfaces of the liner are holes 162, 162a which adapt the liner to receive fasteners.

3. The stator structure 42 for a rotary machine having track openings 56 for receiving a roller assembly 58 of claim 1 wherein the second rail wall 104 extending from the first end and between the first end and the second end has a contour which is cylindrical having a constant radius in a region which extends over one half the distance between the first end and the second end and wherein the contour of the second rail wall is adapted to engage the rotatable element at more than one point in the second position.

4. The stator structure 42 for a rotary machine having track openings 56 for receiving a roller assembly 58 of claim 3 wherein the first rail wall is spaced laterally from the second rail wall and extends parallel to the second rail wall from the first end and between the first and second end for a region which is parallel to at least a portion of the region of the first rail wall that has the constant radius.

5. The stator structure 42 for a rotary machine having track openings 56 for receiving a roller assembly 58 of claim 3 wherein the support member is an end wall extending laterally from the first rail wall to the second rail wall.

6. The stator structure 42 for a rotary machine having track openings 56 for receiving a roller assembly 58 of claim 3 wherein the support member is a base 112 having a thickness Tb, which is connected to the first rail wall, the second rail wall and the end wall.

7. The stator structure 42 for a rotary machine having track openings 56 for receiving a roller assembly 58 of claim 6 wherein the base has an opening 174 for decreasing the rigidity of the base,
    a first flange extending laterally from the base adjacent at least one wall, the first flange having a radial thickness Tfa and at least one hole which adapts the base to receive a fastener, the first flange adapting the liner to engage the circumferentially extending stator structure in the engine,
    a second flange extending laterally from the base adjacent one of said walls having a cylindrical portion, the second flange having a thickness Tfb, the second flange having at least one hole which adapts the base to receive a fastener, the second flange adapting the liner to engage the circumferentially stator structure in the engine, and,
wherein at least one of said walls has a contour which is adapted to conform closely to the contour of the roller assembly in the installed condition, said contour being within a distance from the end wall which is less than the lateral distance between the first and second rail walls measured in a direction perpendicular to the walls over the cylindrical portion.

8. The stator structure 42 for a rotary machine having track openings 56 for receiving a roller assembly 58 of claim 7
    an end with at least one opening extending through the base which interrupts the continuity of the base;
    wherein the base and an end wall connecting the rail walls position and support the rail walls with respect to each other during manufacturing assembly and under operative conditions.

9. The stator structure 42 for a rotary machine having track openings 56 for receiving a roller assembly 58 of claim 6 wherein the base has an opening 174 disposed between the walls 102, 104, 106 for decreasing the rigidity of the base.

10. The stator structure 42 for a rotary machine having track openings 56 for receiving a roller assembly 58 of claim 6 wherein the liner includes a plate 157 which includes the base 112;
    wherein the plate has a first flange 158 extending laterally at a location adjacent at least one wall, the first flange 158 having a radial thickness Tfa and at least one hole which adapts the plate to receive a fastener, the first flange 158 adapting the liner to engage and locate the liner with respect to the circumferentially extending stator structure in the rotary machine;
    wherein the plate includes a second flange 166 extending laterally from the base at a location adjacent one of said walls having cylindrical portion, the second flange 166 having a thickness Tfb, the second flange 166 having at least one hole which adapts the base to receive a fastener, the second flange 166 adapting the liner to engage and locate the liner with respect to the circumferentially extending stator structure in the rotary machine;
    wherein at least one of said walls has a contour which is adapted to conform closely to the contour of the roller assembly in the installed condition at the second position, said contour being within a distance from the end wall which is less than the lateral distance between the first and second rail walls measured in a direction perpendicular to the walls over the cylindrical portion; and,
    wherein the thickness of each of the flanges Tfa, Tfb is greater than the thickness Tb of the base to decrease the rigidity of the liner as compared to liners having a thickness of the base which is equal to the thickness of the flanges.

11. The stator structure 42 for a rotary machine having track openings 56 for receiving a roller assembly 58 of claim 3 wherein the liner includes a plate 157 which has a first flange 158 extending laterally at a location adjacent at least one wall, the first flange 158 having at least one hole which adapts the flange to receive a fastener, the first flange 158 adapting the liner to engage and locate the liner with respect to the circumferentially extending stator structure of the rotary machine;
wherein the plate includes a second flange 166 extending laterally at a location adjacent one of said walls having a cylindrical portion, the second flange 166 having at least one hole which adapts the plate to receive a fastener, the second flange 166 adapting the liner to engage and locate the liner with respect to the circumferentially extending stator structure in the rotary machine;
wherein at least one of said walls has a contour which is adapted to conform closely to the contour of the roller assembly in the installed condition at the second position, said contour being within a distance from the end wall which is less than the lateral distance between the first and second rail walls measured in a direction perpendicular to the walls over the cylindrical portion.

12. The stator structure 42 for a rotary machine having track openings 56 for receiving a roller assembly 58 of claim 1 wherein the support member is an end wall 106 extending laterally from the first rail wall to the second rail wall.

13. The stator structure 42 for a rotary machine having track openings 56 for receiving a roller assembly 58 of claim 1 wherein the support member is a base 112 having a thickness Tb, which is connected to the first rail wall, the second rail wall and the end wall, wherein the base and the end wall connecting the rail walls position and support the rail wall with respect to each other during manufacturing assembly and under operative conditions.

14. The stator structure 42 for a rotary machine having track openings 56 for receiving a roller assembly 58 of claim 11 wherein the base has an opening 174 disposed between the walls 102, 104, 106 for decreasing the rigidity of the base.

15. A stator structure 42 for a rotary machine having a plurality of track openings 56 for engaging an associated roller assembly 58, which comprises:
   a liner 76 having a pair of rail wall for receiving a rotatable element 82 of a roller assembly, the liner being adapted to be disposed circumferentially about the axis of the rotary machine in a track opening and the liner having a first end 152, a second end 154 and an opening 156 extending from the first end to the second end, the liner including
   a first rail wall 102 extending from the first end between the first end and the second end which has a constant radius for a region which extends over one half the distance between the first end and the second end,
   a second rail wall 104 spaced laterally from the first rail wall and extending parallel to the first rail wall from the first end between the first and second end which has a constant radius for a region which is parallel to the first rail wall and,
   an end wall 106 extending laterally from the first rail wall to the second rail wall,
   a plate 157 extending laterally with respect to the rail walls, the plate having
      a base 112 having a thickness Tb, which is connected to the first rail wall, the second rail wall and the end wall,
      a first flange 158 extending laterally from the base 112 adjacent at least one wall, the first flange 158 having a radial thickness Tfa and at least one hole which adapts the plate 157 to receive a fastener, the first flange 158 adapting the liner to engage the circumferentially extending stator structure in the rotary machine,
      a second flange 166 extending laterally from the base 112 adjacent one of said walls having a cylindrical portion, the second flange 166 having a thickness Tfb, a second flange 166 having at least one hole which adapts the plate 157 to receive the fastener, the second flange 166 adapting the liner to engage the circumferentially stator structure in the rotary machine, and,
      an end with at least one opening extending through the base which interrupts the continuity of the base;
   wherein at least one of said walls has a contour which is adapted to conform closely to the contour of the roller assembly in the installed condition, said contour being within a distance from the end wall which is less than the lateral distance between the first and second rail walls measured in a direction perpendicular to the walls over cylindrical portion;
   wherein the base and the end wall connecting the rail walls position and support the rail walls with respect to each other during manufacturing assembly and under operative conditions; and,
   wherein the thickness of each of the flanges Tfa, Tfb is greater than the thickness Tb of the base to decrease the rigidity of the liner as compared to liners having a thickness of the base which is equal to the thickness of the flanges.

* * * * *